United States Patent
Sakai et al.

(10) Patent No.: US 10,811,712 B2
(45) Date of Patent: Oct. 20, 2020

(54) HYDROGEN SUPPLY SYSTEM FOR ADJUSTING DEW POINT OF A HYDROGEN-CONTAINING GAS SUPPLIED THERETO

(71) Applicant: Panasonic Intellectual Property Management Co., Ltd., Osaka (JP)

(72) Inventors: Osamu Sakai, Osaka (JP); Kunihiro Ukai, Nara (JP); Hidenobu Wakita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 16/198,271

(22) Filed: Nov. 21, 2018

(65) Prior Publication Data

US 2019/0173114 A1  Jun. 6, 2019

(30) Foreign Application Priority Data

Dec. 1, 2017 (JP) .................................. 2017-231330

(51) Int. Cl.
*H01M 8/06* (2016.01)
*H01M 8/0662* (2016.01)
(Continued)

(52) U.S. Cl.
CPC .......... *H01M 8/0681* (2013.01); *B01D 53/22* (2013.01); *B01D 53/326* (2013.01); *C01B 3/503* (2013.01);
(Continued)

(58) Field of Classification Search
CPC .......... H01M 8/0681; H01M 8/04201; H01M 8/04164; H01M 8/04126; C25B 15/02;
(Continued)

(56) References Cited

U.S. PATENT DOCUMENTS

2004/0253494 A1  12/2004  Maruyama et al.
2007/0227900 A1  10/2007  Benicewicz et al.
(Continued)

FOREIGN PATENT DOCUMENTS

| JP | 2006-070322 | 3/2006 |
|----|-------------|--------|
| JP | 2017-039636 | 2/2017 |
| WO | 2015/020065 | 2/2015 |

OTHER PUBLICATIONS

The Extended European Search Report dated Mar. 28, 2019 for the related European Patent Application No. 18207929.3.

*Primary Examiner* — Gary D Harris
(74) *Attorney, Agent, or Firm* — McDermott Will & Emery LLP (57) ABSTRACT

A hydrogen supply system includes an electrochemical hydrogen pump which includes: an electrolyte membrane; an anode provided on a first surface of the electrolyte membrane; a cathode provided on a second surface of the electrolyte membrane opposite to the first surface; and a current adjuster adjusting a current amount flowing between the anode and the cathode, and which performs a hydrogen supply operation by allowing a current to flow between the anode and the cathode using the current adjuster so as to boost the pressure of hydrogen which is supplied to an anode side at a cathode side and to supply the pressure-boosted hydrogen to a hydrogen demander; and a dew point adjuster adjusting a dew point of a mixed gas in which a hydrogen-containing gas which is discharged from the anode side and a hydrogen-containing gas which is supplied from an outside are mixed together.

9 Claims, 5 Drawing Sheets

(51) Int. Cl.
  *C25B 15/08* (2006.01)
  *C25B 9/10* (2006.01)
  *C25B 15/02* (2006.01)
  *B01D 53/22* (2006.01)
  *B01D 53/32* (2006.01)
  *C01B 3/50* (2006.01)
  *H01M 8/04119* (2016.01)
  *H01M 8/04082* (2016.01)

(52) U.S. Cl.
  CPC ............... *C25B 9/10* (2013.01); *C25B 15/02* (2013.01); *C25B 15/08* (2013.01); *H01M 8/04126* (2013.01); *H01M 8/04164* (2013.01); *H01M 8/04201* (2013.01); *B01D 2256/16* (2013.01)

(58) Field of Classification Search
  CPC ........... C25B 9/10; C25B 15/08; C01B 3/503; B01D 53/326; B01D 53/22; B01D 2256/16
  USPC ......................................................... 429/411
  See application file for complete search history.

(56) References Cited

U.S. PATENT DOCUMENTS

2016/0168730 A1   6/2016   Watanabe
2016/0332110 A1*  11/2016  Kawabata ................. C25B 1/04
2017/0054170 A1   2/2017   Wakita et al.

* cited by examiner

HYDROGEN SUPPLY SYSTEM FOR ADJUSTING DEW POINT OF A HYDROGEN-CONTAINING GAS SUPPLIED THERETO

BACKGROUND

1. Technical Field

The present disclosure relates to a hydrogen supply system.

2. Description of the Related Art

In recent years, because of environmental issues, such as the global warming, and energy issues, such as depletion of petroleum resources, as clean alternative energy resources instead of fossil fuels, attention has been paid to hydrogen. When hydrogen is combusted, from a theoretical point of view, water is only emitted, carbon dioxide which causes the global warming is not emitted, and nitrogen oxides are also not substantially emitted; hence, hydrogen is expected as clean energy. In addition, as a device using hydrogen as a fuel at a high efficiency, for example, fuel batteries are mentioned, and for automobile power sources and household power generation, the fuel batteries have been developed and spread.

In a coming hydrogen society, technical development has been desired so that, besides hydrogen gas manufacturing, a hydrogen gas can be stored at a high density, and a small volume thereof can be transported or used at a low cost. In particular, in order to facilitate the spread of a fuel battery used as a distributed energy source, a hydrogen supply infrastructure is required to be well organized. In addition, in order to stably supply hydrogen, various techniques, such as manufacturing, purification, and high density storage of a highly pure hydrogen gas, are required to be developed.

For example, in a high-pressure hydrogen manufacturing device in which hydrogen is generated by water electrolysis, since an electrolyte membrane, a low pressure-side electricity feeder, and the like are deformed by a pressure difference between a high pressure side and a low pressure side, the contact resistance between constituent members is increased. Accordingly, in consideration of the deformation of the electrolyte membrane and the low pressure-side electricity feeder, a high pressure hydrogen manufacturing device including a pressing component, such as a disc spring or a coil spring, has been proposed so that a high pressure-side electricity feeder is in tight contact with the electrolyte membrane by pressing (for example, see Japanese Unexamined Patent Application Publication No. 2006-70322). As a result, the increase in contact resistance between the two members can be suppressed.

In addition, while the durability against a high-pressure environment is secured, in order to purify hydrogen from a reformed gas at a low cost and to boost the pressure thereof, there has been proposed an electrochemical hydrogen pump which has a cell structure including layers laminated to each other and a pressing structure applying a fastening force to this cell structure in the lamination direction thereof (for example, see International Publication No. 2015/020065).

In addition, in an electrochemical hydrogen pump including a solid high molecular weight electrolyte membrane, when hydrogen is electrochemically purified, and the pressure thereof is boosted, since water permeates from an anode to a cathode together with hydrogen, a proposal has been made in which in order to efficiently remove water from hydrogen discharged to the cathode, a water condensation trap which traps and discharges water is provided at a hydrogen path (for example, see Japanese Unexamined Patent Application Publication No. 2017-39636).

SUMMARY

In a hydrogen supply system, a highly efficient hydrogen supply has been desired, and an increase in efficiency of hydrogen supply operation of an electrochemical hydrogen pump is important.

However, in a related example, although the increase in efficiency of hydrogen supply operation has been investigated in view of an electric contact between a catalyst layer and an electricity feeder of an electrochemical hydrogen pump, in view of dew point adjustment of a hydrogen-containing gas which is supplied to an anode of the electrochemical hydrogen pump, the increase in efficiency of hydrogen supply operation of the electrochemical hydrogen pump has not been investigated.

One non-limiting and exemplary embodiment provides a hydrogen supply system which is able to efficiently perform a hydrogen supply operation of an electrochemical hydrogen pump as compared to that in the past.

In one general aspect, the techniques disclosed here feature a hydrogen supply system comprising: an electrochemical hydrogen pump which includes: an electrolyte membrane; an anode provided on a first surface of the electrolyte membrane; a cathode provided on a second surface of the electrolyte membrane opposite to the first surface; and a current adjuster adjusting a current amount flowing between the anode and the cathode, and which performs a hydrogen supply operation by allowing a current to flow between the anode and the cathode using the current adjuster so as to boost the pressure of hydrogen which is supplied to an anode side at a cathode side and to supply the pressure-boosted hydrogen to a hydrogen demander; and a dew point adjuster adjusting a dew point of a mixed gas in which a hydrogen-containing gas which is discharged from the anode side and a hydrogen-containing gas which is supplied from an outside are mixed together.

The hydrogen supply system according to the aspect of the present disclosure has an advantage in that the hydrogen supply operation of the electrochemical hydrogen pump can be efficiently performed as compared to that in the past.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An increase in efficiency of hydrogen supply operation of an electrochemical hydrogen pump has been intensively investigated, and as a result, the following knowledge was obtained.

For example, in an electrochemical hydrogen pump including a solid high molecular weight electrolyte membrane, when hydrogen is electrochemically purified and pressure-boosted, the pump performance (efficiency performance indicated by the overvoltage) is determined by a wet state of the electrolyte membrane and a water state at an electrode of the electrochemical hydrogen pump.

In this case, in accordance with the operation temperature of the electrochemical hydrogen pump, a humidification amount of a hydrogen-containing gas which is supplied to an anode of the electrochemical hydrogen pump is preferably set to an appropriate amount.

If the humidification amount of the hydrogen-containing gas is insufficient, the proton conductivity of the electrolyte membrane may be decreased in some cases. As a result, since the electric energy of the electrochemical hydrogen pump during a hydrogen supply operation is increased, the efficiency of the hydrogen supply operation of the electrochemical hydrogen pump is decreased.

On the other hand, when the humidification amount of the hydrogen-containing gas is excessive, since moisture in the hydrogen-containing gas is condensed, a gas flow path of the electrochemical hydrogen pump is liable to be blocked by the condensate water. Accordingly, a hydrogen diffusivity of the electrochemical hydrogen pump is liable to be degraded. In the case described above, since an electric power required for the pump operation to secure a desired proton transfer is increased, the efficiency of the hydrogen supply operation of the electrochemical hydrogen pump is decreased.

Accordingly, the present inventors have conceived to adjust the dew point of a hydrogen-containing gas which is supplied to an anode of an electrochemical hydrogen pump.

That is, a hydrogen supply system of a first aspect of the present disclosure comprises: an electrochemical hydrogen pump which includes: an electrolyte membrane; an anode provided on a first surface of the electrolyte membrane; a cathode provided on a second surface of the electrolyte membrane opposite to the first surface; and a current adjuster adjusting a current amount flowing between the anode and the cathode, and which performs a hydrogen supply operation by allowing a current to flow between the anode and the cathode using the current adjuster so as to boost the pressure of hydrogen which is supplied to an anode side at a cathode side and to supply the pressure-boosted hydrogen to a hydrogen demander; and a dew point adjuster adjusting a dew point of a mixed gas in which a hydrogen-containing gas which is discharged from the anode side and a hydrogen-containing gas which is supplied from an outside are mixed together.

According to the structure described above, the hydrogen supply system of this aspect is able to efficiently perform the hydrogen supply operation of the electrochemical hydrogen pump as compared to that in the past. In particular, if the humidification amount of the above mixed gas is insufficient, although the proton conductivity of the electrolyte membrane may be degraded in some cases, according to the hydrogen supply system of this aspect, since the dew point of the mixed gas described above can be appropriately adjusted, the probability of the above degradation can be decreased. In addition, if the humidification amount of the mixed gas as described above is excessive, moisture in the mixed gas is condensed, and a gas flow path of the electrochemical hydrogen pump may be blocked by the condensate water in some cases; however, according to the hydrogen supply system of this aspect, since the dew point of the mixed gas as described above can be appropriately adjusted, the probability of the above blockage can be decreased.

According to a hydrogen supply system of a second aspect of the present disclosure, in the hydrogen supply system of the first aspect, the dew point adjuster may include a humidifier which humidifies the above mixed gas.

According to the structure described above, when the humidification amount of the mixed gas described above is insufficient, the hydrogen supply system of this aspect can humidify the mixed gas by the humidifier. Compared to the case in which the humidifier as described above is not provided, the proton conductivity of the electrolyte membrane of the electrochemical hydrogen pump can be suppressed from being degraded.

According to a hydrogen supply system of a third aspect of the present disclosure, in the hydrogen supply system of the first aspect, the dew point adjuster may include a first condenser which condenses moisture contained in the above mixed gas.

According to the structure described above, when the humidification amount of the above mixed gas is excessive, the hydrogen supply system of this aspect is able to dehumidify the mixed gas by the first condenser. Hence, compared to the case in which the first condenser as described above is not provided, the gas flow path of the electrochemical hydrogen pump is suppressed from being blocked by the condensate water.

According to a hydrogen supply system of a fourth aspect of the present disclosure, the hydrogen supply system according to any one of the first to the third aspects may further comprise a second condenser condensing moisture contained in the hydrogen-containing gas which is discharged from the anode side but not yet mixed with the hydrogen-containing gas which is supplied from the outside.

According to the structure described above, even when the dew point of the hydrogen-containing gas which is discharged from the anode side of the electrochemical hydrogen pump is high, the hydrogen supply system of this aspect is able to appropriately remove water in the hydrogen-containing gas by the second condenser. Hence, compared to the case in which the second condenser as described above is not provided, the probability in which the flow of the hydrogen-containing gas becomes unstable by the water in the hydrogen-containing gas can be decreased.

According to a hydrogen supply system of a fifth aspect of the present disclosure, the hydrogen supply system according to any one of the first to the fourth aspects may further comprise a first gas-liquid separator performing a gas-liquid separation of the hydrogen-containing gas which is discharged from the anode side but not yet mixed with the hydrogen-containing gas which is supplied from the outside.

According to the structure described above, even when the dew point of the hydrogen-containing gas which is discharged from the anode side of the electrochemical hydrogen pump is high, the hydrogen supply system of this aspect is able to appropriately remove water in the hydrogen-containing gas by the first gas-liquid separator. Hence, compared to the case in which the first gas-liquid separator as described above is not provided, the probability in which the flow of the hydrogen-containing gas becomes unstable by the water in the hydrogen-containing gas can be decreased.

According to a hydrogen supply system of a sixth aspect of the present disclosure, the hydrogen supply system according to any one of the first to the fifth aspects may further comprise a second gas-liquid separator performing a gas-liquid separation of a hydrogen-containing gas which is discharged from the cathode side and a water path supplying water separated from the hydrogen-containing gas by the second gas-liquid separator to the dew point adjuster.

According to the structure described above, the hydrogen supply system of this aspect is able to supply the water in the hydrogen-containing gas which is discharged from the cathode side to the dew point adjuster using the second gas-liquid separator and the water path. Accordingly, the water in the hydrogen-containing gas which is discharged from the cathode side can be re-used for gas humidification in the dew point adjuster. Hence, the amount of water to be replenished to the hydrogen supply system from the outside can be decreased.

According to a hydrogen supply system of a seventh aspect of the present disclosure, the hydrogen supply system according to any one of the first to the sixth aspects may further comprise a first controller adjusting the dew point of the above mixed gas by controlling the operation of the dew point adjuster.

For example, when the dew point adjuster has a bubbler structure in which the mixed gas is allowed to flow through hot water, the first controller can easily and appropriately control the dew point of the mixed gas by controlling the temperature of the hot water.

In addition, for example, when the dew point adjuster includes a moisture permeable film, the first controller can easily and appropriately control the dew point of the mixed gas by controlling the temperature of the moisture permeable film.

Incidentally, the current amount flowing between the anode and the cathode of the electrochemical hydrogen pump corresponds to the conduction amount of protons passing through the electrolyte membrane. Hence, when the current amount flowing between the anode and the cathode is controlled by the control of the current adjuster, the amount of water transferred from the anode to the cathode together with protons can be controlled.

According to a hydrogen supply system of an eighth aspect of the present disclosure, the hydrogen supply system according to any one of the first to the seventh aspects may further comprise a second controller which changes the dew point of the hydrogen-containing gas which is discharged from the anode side but not yet mixed with the hydrogen-containing gas which is supplied from the outside by adjusting the current amount flowing between the anode and the cathode by the control of the current adjuster.

In addition, when the temperature of the mixed gas discharged from the dew point adjuster is decreased to less than the dew point of the mixed gas by heat dissipation and the like, the condensation of moisture in the mixed gas occurs.

According to a hydrogen supply system of a ninth aspect of the present disclosure, the hydrogen supply system according to any one of the first to the eighth aspects may further comprise a heater heating the mixed gas discharged from the dew point adjuster and a third controller which increases the temperature of the mixed gas heated by the heater to the dew point or more of the mixed gas discharged from the dew point adjuster by the control of the heater.

According to the structure described above, compared to the case in which the heater described above is not provided, since the condensation of moisture in the mixed gas is not likely to occur, the hydrogen supply system of this aspect can suppress the flow of the mixed gas from becoming unstable by the condensate water. In addition, the gas flow path of the electrochemical hydrogen pump is suppressed from being blocked by the intrusion of the condensate water into the anode.

Hereinafter, with reference to the attached drawings, embodiments of the present disclosure will be described. The following embodiments are each described to show one example of each of the above aspects. Hence, unless otherwise particularly described in claims, the shapes, the materials, the constituent elements, the arrangement of the constituent elements, and the connection mode therebetween, and the like described below are not intended to limit the above aspects. In addition, among the following constituent elements, constituent elements which are not described in independent claims, each of which indicates the topmost concept of the aspect, will be described as arbitrary constituent elements. In addition, description of constituent elements denoted by the same reference numeral in the drawings may be omitted in some cases. In addition, in order to facilitate the understanding of the drawings, the constituent elements are schematically shown, and the shape, the dimensional ratio, and the like may not be accurately drawn in some cases.

First Embodiment

[Apparatus Structure]

Figure 1:
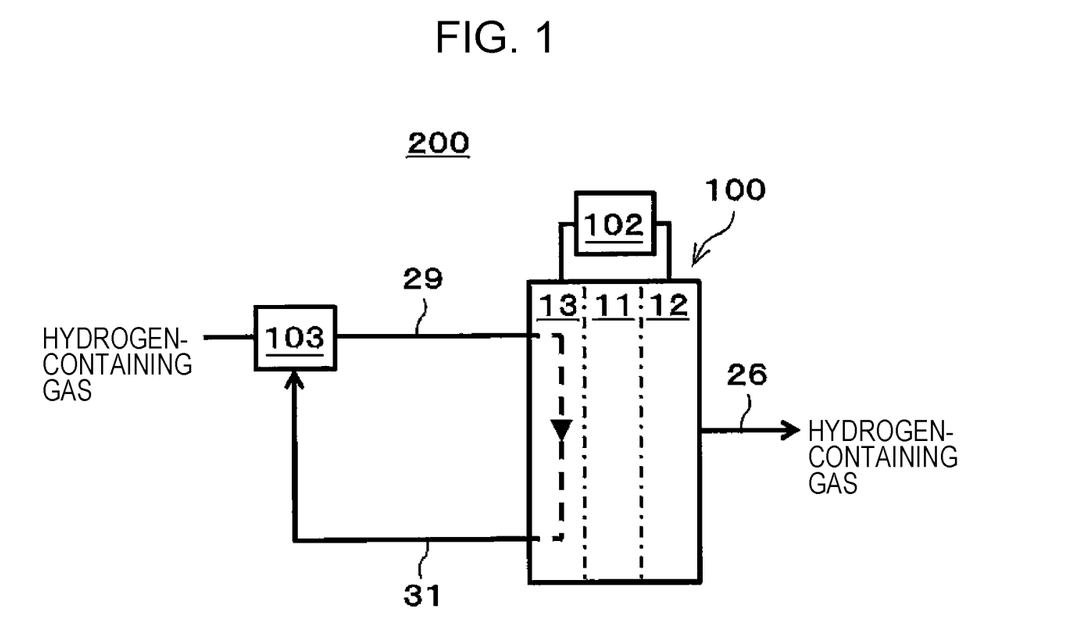
FIG. 1 is a schematic view showing one example of a hydrogen supply system of a first embodiment.

FIG. 1 is a schematic view showing one example of a hydrogen supply system of a first embodiment.

In the example shown in FIG. 1, a hydrogen supply system 200 includes an electrochemical hydrogen pump 100 and a dew point adjuster 103. The electrochemical hydrogen pump 100 includes an electrolyte membrane 11, an anode 13, a cathode 12, and a current adjuster 102.

The anode 13 and the cathode 12 are a pair of electrodes provided on both surfaces of the electrolyte membrane 11. In particular, the cathode 12 is provided on one main surface of the electrolyte membrane 11, and the anode 13 is provided on the other main surface of the electrolyte membrane 11.

The current adjuster 102 is a device adjusting a current amount flowing between the anode 13 and the cathode 12. As long as capable of adjusting the current amount flowing between the anode 13 and the cathode 12, the current adjuster 102 may have any structure.

The current adjuster 102 may be, for example, a voltage applier adjusting the voltage to be applied between the anode 13 and the cathode 12. As the voltage applier, for example, a DC/DC converter or an AC/DC converter may be mentioned. The DC/DC converter is used when the voltage applier is connected to a direct current power source, such as a battery, and the AC/DC converter is used when the voltage applier is connected an alternating current power source, such as a commercial power source. When the current adjuster 102 is the voltage applier, a high potential side terminal of the voltage applier is connected to the anode 13, and a low potential side terminal of the voltage applier is connected to the cathode 12.

The electrochemical hydrogen pump 100 is an apparatus performing a hydrogen supply operation in which the current is allowed to flow between the anode 13 and cathode 12 by the current adjuster 102 so that the pressure of hydrogen which is supplied to an anode 13 side is boosted at a cathode 12 side, and the pressure-boosted hydrogen is supplied to a hydrogen demander. As the hydrogen demander, for example, a household or an automotive fuel battery may be mentioned.

In particular, by the anode 13 of the electrochemical hydrogen pump 100, protons ($H^+$) are generated from a hydrogen gas ($H_2$) in the hydrogen-containing gas. Accordingly, protons ($H^+$) permeate the electrolyte membrane 11, and a hydrogen gas ($H_2$) is generated at the cathode 12 of the electrochemical hydrogen pump 100. In this stage, since the volume of a hydrogen gas generated at the cathode 12 is increased, the pressure of the hydrogen gas is boosted. That is, the electrochemical hydrogen pump 100 functions as a pressure booster pump which electrochemically boosts the pressure of a hydrogen gas. In addition, the hydrogen gas generated at the cathode 12 of the electrochemical hydrogen pump 100 is supplied to the above hydrogen demander through a cathode gas outlet path 26.

In addition, the details of a structural example of the electrochemical hydrogen pump 100 and the details of a hydrogen supply operation of the electrochemical hydrogen pump 100 will be described later.

The dew point adjuster 103 is a device which adjusts the dew point of a mixed gas in which a hydrogen-containing gas which is discharged from the anode 13 side and a hydrogen-containing gas which is supplied from the outside are mixed together. In particular, the hydrogen-containing which is discharged from the anode 13 side is supplied to the dew point adjuster 103 through an anode gas outlet path 31. In addition, the mixed gas discharged from the dew point adjuster 103 is supplied to the anode 13 of the electrochemical hydrogen pump 100 through an anode gas inlet path 29. In addition, although the dew point adjuster 103 shown in FIG. 1 and the other dew point adjusters shown in the following drawings are each provided at a junction between the anode gas inlet path 29 and the anode gas outlet path 31, the structure is not limited to that described above. The dew point adjuster 103 may be provided at the anode gas inlet path 29 at a downstream side than the junction described above. That is, as long as the dew point of the mixed gas can be adjusted, the dew point adjuster 103 may be provided at any place of the anode gas inlet path 29.

In addition, although the dew point adjuster 103 may also include a mixer mixing the hydrogen-containing gas which is discharged from the anode 13 side and the hydrogen-containing gas which is supplied from the outside, a mixer (not shown) may also be provided separately from the dew point adjuster 103.

As long as the dew point of the above mixed gas can be adjusted, the dew point adjuster 103 may have any structure. The details of the dew point adjuster 103 will be described in examples.

Although not shown in FIG. 1, devices necessary for the hydrogen supply operation of the hydrogen supply system 200 may be appropriately provided.

For example, in the hydrogen supply system 200, the hydrogen-containing gas may be supplied to the dew point adjuster 103 from an external gas supply source (not shown) having a predetermined supply pressure. As the external gas supply source, for example, a gas storage device (such as a gas cylinder) or a gas supply infrastructure may be mentioned.

In addition, as the hydrogen-containing gas, for example, a hydrogen gas may be mentioned. In this case, the hydrogen gas may be generated by a water electrolysis apparatus.

In addition, in the hydrogen supply system 200, for example, there may be provided a temperature detector detecting the temperature of the electrochemical hydrogen pump 100, a hydrogen storage device temporarily storing a hydrogen gas discharged from the cathode 12 of the electrochemical hydrogen pump 100, and a pressure detector detecting the gas pressure in the hydrogen storage device.

In addition, the above devices (not shown) are described by way of example and are not limited to those mentioned above.

[Structure of Electrochemical Hydrogen Pump]

Figure 2A:
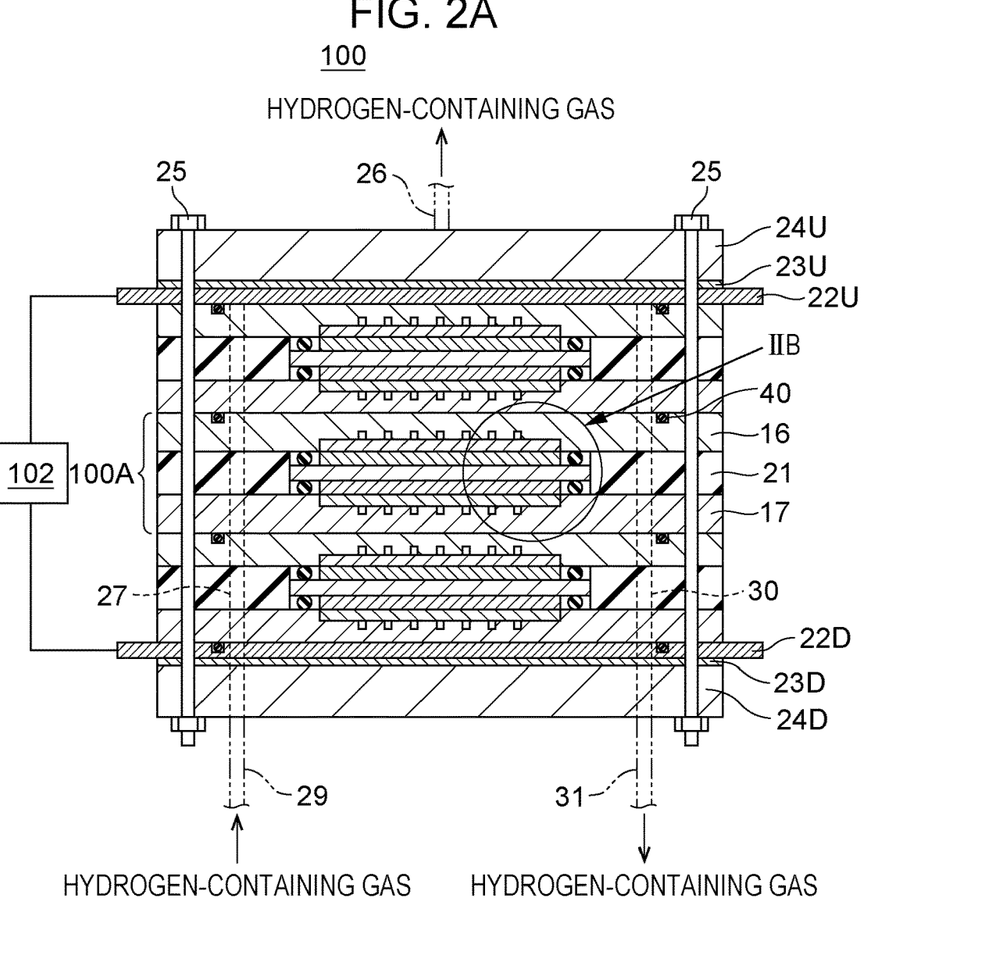
FIG. 2A is a schematic view showing one example of an electrochemical hydrogen pump of the hydrogen supply system of the first embodiment.
Figure 2B:
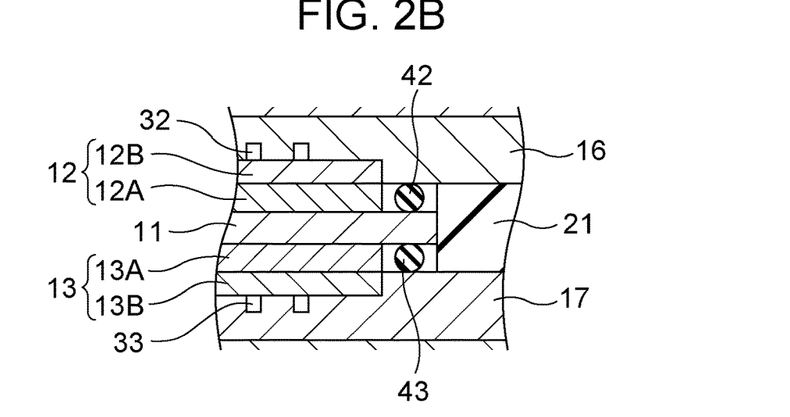
FIG. 2B is a partially enlarge view of the electrochemical hydrogen pump shown in FIG. 2A.

FIGS. 2A and 2B are schematic views each showing one example of the electrochemical hydrogen pump of the hydrogen supply system of the first embodiment. FIG. 2B is an enlarged view of the IIB portion shown in FIG. 2A.

As shown in FIGS. 2A and 2B, a single cell 100A of the electrochemical hydrogen pump 100 includes an electrolyte membrane 11, an anode 13, a cathode 12, a cathode separator 16, and anode separator 17, and an insulating member 21.

The cathode 12 is formed, for example, of a cathode catalyst layer 12A and a cathode gas diffusion layer 12B. The anode 13 is formed, for example, of an anode catalyst layer 13A and an anode gas diffusion layer 13B.

Accordingly, the electrolyte membrane 11 is sandwiched by the anode 13 and the cathode 12 so as to be in contact with the anode catalyst layer 13A and the cathode catalyst layer 12A. In addition, a laminate of the cathode 12, the electrolyte membrane 11, and the anode 13 is called a membrane electrode assembly (hereinafter, referred to as "MEA").

The details of the electrolyte membrane 11, the cathode catalyst layer 12A, the cathode gas diffusion layer 12B, the anode catalyst layer 13A, and the anode gas diffusion layer 13B will be described later.

At a central portion of each of the cathode separator 16 and the anode separator 17, a recess is provided. In the recesses described above, the cathode gas diffusion layer 12B and the anode gas diffusion layer 13B are received. In addition, when the above MEA is sandwiched by the cathode separator 16 and the anode separator 17, the single cell 100A is formed.

In a main surface of the cathode separator 16 in contact with the cathode gas diffusion layer 12B, when viewed in plan, for example, a serpentine or a linear cathode gas flow path 32 is provided. In a main surface of the anode separator 17 in contact with the anode gas diffusion layer 13B, when viewed in plan, for example, a serpentine or a linear anode gas flow path 33 is provided.

In addition, between the electrically conductive cathode separator 16 and anode separator 17, an annular or a plate insulating member 21 is sandwiched so as to surround the periphery of the MEA. Accordingly, short circuit between the cathode separator 16 and the anode separator 17 can be prevented.

Although the electrochemical hydrogen pump 100 of this embodiment has a stack structure in which three single cells 100A are laminated to each other, the number of the single cells 100A is not limited thereto. The number of the single cells 100A may be appropriately set in consideration of the operation conditions, such as the hydrogen amount, of the electrochemical hydrogen pump 100.

In this case, in order to appropriately maintain the laminate state of a plurality of the single cells 100A, the end surface of the topmost cathode separator 16 and the end surface of the bottommost anode separator 17 of the single cells 100A are sandwiched by an end plate 24U and an end plate 24D with an electricity feed plate 22U/an insulting plate 23U and an electricity feed plate 22D/an insulating plate 23D interposed therebetween, respectively, so as to apply a desired fastening pressure to the single cells 100A.

Accordingly, fastening devices 25 to apply a fastening pressure to the single cells 100A are provided at appropriate positions of the end plate 24U and the end plate 24D. As long as the single cells 100A can be fastened, the fastening device 25 may have any structure. As the fastening device 25, for example, a bolt penetrating the end plate 24U and the end plate 24D and a nut with a disc spring may be mentioned.

In the end plate 24U, the cathode gas outlet path 26 (see FIG. 1) is provided. The cathode gas outlet path 26 may be formed of a pipe through which a hydrogen-containing gas which is discharged from the cathode 12 side flows. In particular, the cathode gas outlet path 26 communicates with a tubular cathode gas outlet manifold (not shown) provided for the single cells 100A laminated to each other. In addition, this tubular cathode gas outlet manifold communicates with the respective cathode gas flow paths 32 of the single cells 100A with cathode gas communication paths (not shown) interposed therebetween. Accordingly, hydrogen-containing gases passing through the cathode gas flow paths 32 of the single cells 100A are merged at the cathode gas outlet manifold. In addition, the hydrogen-containing gases thus merged are introduced to the cathode gas outlet path 26.

Between the cathode separator 16 and the anode separator 17, when viewed in plan, a sealing member, such as an O ring (not shown), is provided so as to surround the cathode gas outlet manifold, and the cathode gas outlet manifold is appropriately sealed by this sealing member.

In the end plate 24D, the anode gas inlet path 29 (see FIG. 1) is provided. The anode gas inlet path 29 may be formed of a pipe through which the hydrogen-containing gas which is supplied to the anode 13 side flows. In particular, the anode gas inlet path 29 communicates with a tubular anode gas inlet manifold 27 provided for the single cells 100A laminated to each other. In addition, this tubular anode gas inlet manifold 27 communicates with one end portion of the anode gas flow path 33 of each of the single cells 100A with an anode gas communication path (not shown) interposed therebetween. Accordingly, the hydrogen-containing gas from the anode gas inlet path 29 is distributed to the single cells 100A through the anode gas inlet manifold 27 communicating with the respective anode gas flow paths 33 of the single cells 100A. In addition, the hydrogen-containing gas thus distributed is supplied to the anode catalyst layer 13A from the anode gas diffusion layer 13B.

In addition, in the end plate 24D, the anode gas outlet path 31 (see FIG. 1) is provided. The anode gas outlet path 31 may be formed of a pipe through which the hydrogen-containing gas which is discharged from the anode 13 side flows. In particular, the anode gas outlet path 31 communicates with a tubular anode gas outlet manifold 30 provided for the single cells 100A laminated to each other. In addition, this tubular anode gas outlet manifold 30 communicates with the other end portion of the anode gas flow path 33 of each of the single cells 100A with an anode gas communication path (not shown) interposed therebetween. Accordingly, hydrogen-containing gases passing through the anode gas flow paths 33 of the single cells 100A are merged at the anode gas outlet manifold 30. In addition, the hydrogen-containing gases thus merged are introduced to the anode gas outlet path 31.

Between the cathode separator 16 and the anode separator 17, when viewed in plan, a sealing member 40, such as an O ring, is provided so as to surround the anode gas inlet manifold 27 and the anode gas outlet manifold 30, and the anode gas inlet manifold 27 and the anode gas outlet manifold 30 are appropriately sealed by this sealing member 40.

The electrolyte membrane 11 is an electrolyte membrane having a proton conductivity which enables protons ($H^+$) to pass therethrough. As long as having a proton conductivity, the electrolyte membrane 11 may have any structure. For example, as the electrolyte membrane 11, a fluorinated high molecular weight electrolyte membrane may be mentioned. In particular, although Nafion (registered trade name, manufactured by Du Pont), Aciplex (registered trade name, manufactured by Asahi Kasei Corporation), or the like may be used, the electrolyte membrane is not limited thereto.

The cathode catalyst layer 12A is provided on one main surface of the electrolyte membrane 11. In addition, when viewed in plan, a sealing member 42 is provided so as to surround the periphery of the cathode catalyst layer 12A, and the cathode catalyst layer 12A is appropriately sealed by the sealing member 42. Although the cathode catalyst layer 12A may contain platinum (Pt) or the like as a catalyst metal, the cathode catalyst layer 12A is not limited thereto.

The anode catalyst layer 13A is provided on the other main surface of the electrolyte membrane 11. In addition, when viewed in plan, a sealing member 43 is provided so as to surround the periphery of the anode catalyst layer 13A, and the anode catalyst layer 13A is appropriately sealed by the sealing member 43. Although the anode catalyst layer 13A may contain Pt or the like as a catalyst metal, the anode catalyst layer 13A is not limited thereto.

As a method to prepare the catalyst for the cathode catalyst layer 12A and the anode catalyst layer 13A, various methods may be mentioned and are not particularly limited. For example, as a support of the catalyst, electrically conductive oxide powder and carbon-based powder may be mentioned. As the carbon-based powder, for example, a powder of graphite, carbon black, or electrically conductive active carbon may be mentioned. A method to support platinum or another catalyst metal on a support, such as carbon, is not particularly limited. For example, a method, such as powder mixing or liquid phase mixing, may be used. As the latter liquid phase mixing, for example, a method in which a support, such as carbon, is dispersed in a catalyst component colloid liquid so as to be adsorbed thereto may be mentioned. In addition, if needed, an active oxygen removing material is used as the support, and platinum or another catalyst metal is supported thereon by the method described above. The state in which the catalyst metal, such as platinum, is supported on the support is not particularly limited. For example, the catalyst metal may be formed into fine particles and then supported on the support in a highly dispersed state.

The cathode gas diffusion layer 12B is formed, for example, of a porous body or the like and has an electric conductivity and a gas diffusivity. For example, as the cathode gas diffusion layer 12B, a metal fiber sintered body formed from a raw material, such as titanium, a titanium alloy, or stainless steel, a metal powder sintered body, an expanded metal, a metal mesh, or a punched metal may be used. In addition, a porous carbon material, such as carbon paper, a carbon cloth, or a carbon felt, may also be used. In addition, for example, a porous sheet material formed by kneading and rolling of carbon black and an elastomer, such as PTFE, may also be used.

The cathode gas diffusion layer 12B is preferably a member having elasticity which may follow the displacement and deformation of a constituent member generated by the difference in pressure between the anode 13 and the cathode 12 during hydrogen supply operation of the electrochemical hydrogen pump 100.

The anode gas diffusion layer 13B is formed, for example, of a porous body or the like and has an electric conductivity and a gas diffusivity. For example, as the anode gas diffusion layer 13B, a metal fiber sintered body formed from a raw material, such as titanium, a titanium alloy, or stainless steel, a metal powder sintered body, an expanded metal, a metal mesh, or a punched metal may be used.

The anode gas diffusion layer 13B is preferably a member having a high rigidity which can suppress the displacement and deformation of a constituent member generated by the difference in pressure between the anode 13 and the cathode 12 during hydrogen supply operation of the electrochemical hydrogen pump 100.

As described above, the current adjuster 102 is a device adjusting the current amount flowing between the anode 13 and the cathode 12.

In this example, as the current adjuster 102, a voltage applier, such as a direct current power source, is used; a low potential side terminal of the voltage applier is connected to the electricity feed plate 22U in contact with the topmost cathode separator 16; and a high potential side terminal of the voltage applier is connected to the electricity feed plate 22D in contact with the bottommost anode separator 17.

In addition, the structure of the above electrochemical hydrogen pump 100 is described by way of example and is not limited to this example.

[Operation]

Hereinafter, the hydrogen supply operation of the electrochemical hydrogen pump 100 will be described with reference to the drawings.

The following operation may be performed, for example, by a computing circuit of a controller (not shown) in accordance with a control program from a storage circuit of the controller. However, the following operation is not always required to be performed by the controller. An operator may also perform all or part of the operation.

First, when a low pressure hydrogen-containing gas is supplied to the anode 13 of the electrochemical hydrogen pump 100 through the anode gas inlet path 29, the electric power of the voltage applier is simultaneously supplied to the electrochemical hydrogen pump 100.

Accordingly, at the anode catalyst layer 13A of the anode 13, a hydrogen molecule is dissociated into hydrogen ions (protons) and electrons by an oxidation reaction (Formula (1)). The protons are conducted to the cathode catalyst layer 12A through the electrolyte membrane 11. The electrons are transferred to the cathode catalyst layer 12A of the cathode 12 through the voltage applier.

In addition, at the cathode catalyst layer 12A of the cathode 12, a hydrogen molecule is again generated by a reduction reaction (Formula (2)). In addition, it has been known that when the protons are conducted through the electrolyte membrane 11, a predetermined amount of water is transferred from the anode 13 to the cathode 12 as electro-osmotic water together with the protons.

In this case, by the use of a flow rate adjuster (not shown) (such as a back pressure valve, or an adjusting valve provided at a pipe) provided at the cathode gas outlet path 26, the pressure loss of the cathode gas outlet path 26 is increased, so that the pressure of the hydrogen gas generated at the cathode 12 can be boosted. Hence, a highly pressurized hydrogen gas can be stored, for example, in a hydrogen storage device (not shown).

$$\text{Anode: } H_2(\text{low pressure}) \rightarrow 2H^+ + 2e^- \quad (1)$$

$$\text{Cathode: } 2H^+ + 2e^- \rightarrow H_2(\text{high pressure}) \quad (2)$$

Incidentally, in order to perform the hydrogen supply operation of the electrochemical hydrogen pump 100 at a high efficiency so as to decrease the electric power to be consumed by the voltage applier, the proton conductivity of the electrolyte membrane 11 is required to be sufficiently increased. In addition, as the moisture content of the electrolyte membrane 11 is increased, the proton conductivity of the electrolyte membrane 11 is increased; hence, the electrolyte membrane 11 is required to be maintained in a sufficiently wet state.

For example, when the electrolyte membrane 11 is a fluorinated high molecular weight electrolyte membrane, the operation temperature of the electrochemical hydrogen pump 100 is frequently set to approximately 70° C. In this case, the dew point of the hydrogen-containing gas which is supplied to the anode 13 is preferably adjusted to approximately 70° C. In addition, the above temperature is described by way of example and is not limited to this example.

If the humidification amount of the hydrogen-containing gas which is supplied to the anode 13 is insufficient, the proton conductivity of the electrolyte membrane 11 may be degraded in some cases. As a result, since the electric energy of the electrochemical hydrogen pump 100 during the hydrogen supply operation is increased, the efficiency of the hydrogen supply operation of the electrochemical hydrogen pump 100 is decreased.

On the other hand, when the humidification amount of the hydrogen-containing gas which is supplied to the anode 13 is excessive, since moisture in the hydrogen-containing gas is condensed, the gas flow path of the electrochemical hydrogen pump 100 may be blocked by the condensate water in some cases (flooding phenomenon). As a result, the hydrogen diffusivity of the electrochemical hydrogen pump 100 is liable to be disturbed. In this case, since an electric power required for a pump operation to secure a desired proton transfer is increased, the efficiency of the hydrogen supply operation of the electrochemical hydrogen pump 100 is decreased.

Accordingly, as described above, the hydrogen supply system 200 of this embodiment includes the dew point adjuster 103 adjusting the dew point of the mixed gas in which the hydrogen-containing gas which is discharged from the anode 13 side and the hydrogen-containing gas which is supplied from the outside are mixed together. In addition, the mixed gas processed by the dew point adjustment is configured to be supplied to the anode 13 of the electrochemical hydrogen pump 100 through the anode gas inlet path 29.

Accordingly, in the hydrogen supply system 200 of this embodiment, the hydrogen supply operation of the electrochemical hydrogen pump 100 can be efficiently performed as compared to that in the past. In particular, if the humidification amount of the above mixed gas is insufficient, although the proton conductivity of the electrolyte membrane 11 may be degraded in some cases, according to the hydrogen supply system 200 of this embodiment, the dew point of the mixed gas described above can be appropriately adjusted, so that the probability of the above degradation can be decreased. In addition, if the humidification amount of the above mixed gas is excessive, the moisture in the mixed gas is condensed, and the gas flow path of the electrochemical hydrogen pump 100 may be blocked by the condensate water in some cases; however, according to the hydrogen supply system 200 of this embodiment, since the dew point of the mixed gas described above can be appropriately adjusted, the probability of the above blockage can be decreased.

In addition, in the electrochemical hydrogen pump 100, as the utilization ratio of the hydrogen-containing gas is increased, the hydrogen gas amount transferred from the anode 13 to the cathode 12 is increased. However, when the utilization ratio of the hydrogen-containing gas is increased, depending on the physical properties of the electrolyte membrane 11, the moisture content of the hydrogen-containing gas flowing through the anode gas flow path 33 of the anode 13 may be increased in some cases. As a result, the hydrogen diffusivity to the anode catalyst layer 13A may be disturbed in some cases.

Hence, in the hydrogen supply system 200 of this embodiment, the structure in which the hydrogen-containing gas which is supplied to the anode 13 is partially discharged from the anode 13 side and the structure in which the hydrogen-containing gas which is discharged from the anode 13 side is re-used by mixing with the hydrogen-containing gas which is supplied from the outside are formed.

Accordingly, while the factor of disturbing the hydrogen diffusion to the anode catalyst layer 13A is alleviated, the utilization ratio of the hydrogen-containing gas supplied to the anode 13 can be substantially increased, and hence, the hydrogen supply operation of the electrochemical hydrogen pump 100 can be highly efficiently performed.

EXAMPLES

Figure 3A:
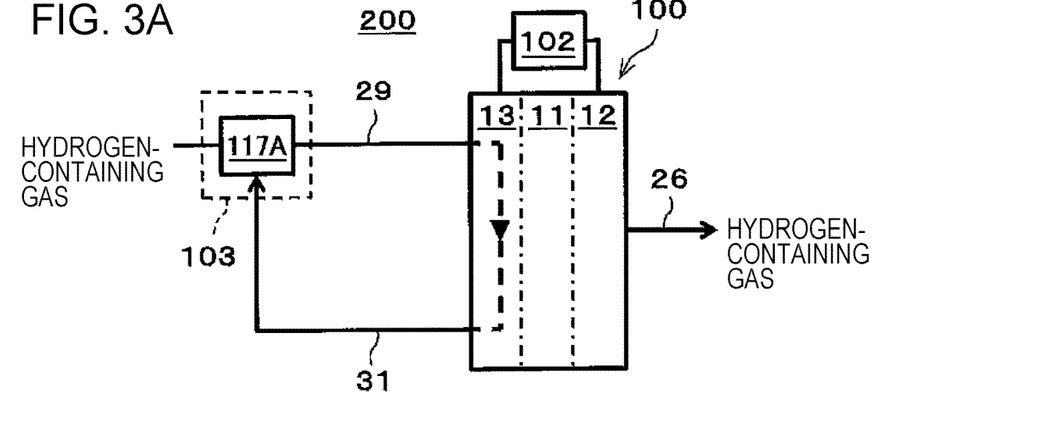
FIG. 3A is a schematic view showing a hydrogen supply system of an example of the first embodiment.
Figure 3B:
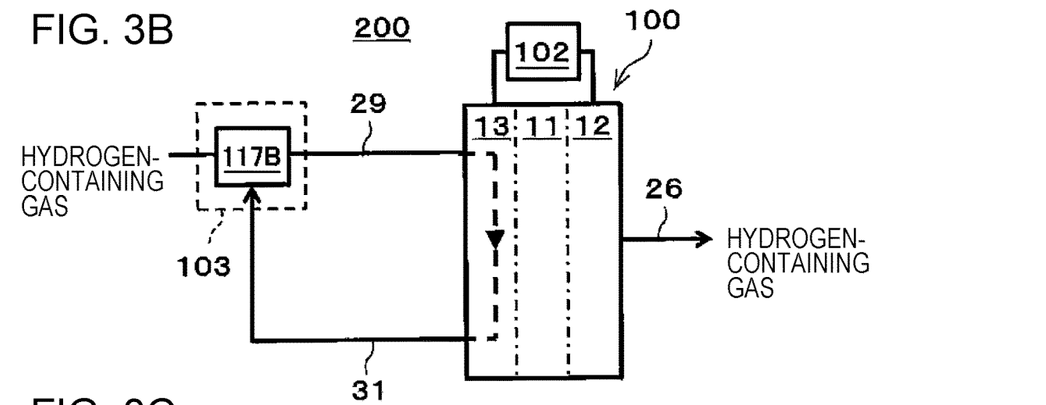
FIG. 3B is a schematic view showing another hydrogen supply system of the example of the first embodiment.

FIGS. 3A and 3B are schematic views each showing a hydrogen supply system of an example of the first embodiment.

In each of the examples shown in FIGS. 3A and 3B, a hydrogen supply system 200 includes an electrochemical hydrogen pump 100 and a dew point adjuster 103. Since the electrochemical hydrogen pump 100 is similar to that of the first embodiment, description thereof is omitted.

As described above, the hydrogen supply system 200 of this example has the structure in that a hydrogen-containing gas which is discharged from an anode 13 side is mixed with a hydrogen-containing gas which is supplied from the outside. In this case, a moisture amount contained in the hydrogen-containing gas which is supplied from the outside is different from a moisture amount contained in the hydrogen-containing gas which is discharged from the anode 13 side. Hence, it is difficult to appropriately understand the moisture amount in a mixed gas which is supplied to the anode 13. Accordingly, the humidification amount of the mixed gas described above may be insufficient or excessive in some cases.

Hence, when the humidification amount of the mixed gas which is supplied to the anode 13 is insufficient, as shown in FIG. 3A, the dew point adjuster 103 includes a humidifier 117A which humidifies the mixed gas. As the humidifier 117A, for example, there may be mentioned a humidifier having a bubbler structure in which the mixed gas is allowed to pass through hot water for humidification or a humidifier having the structure in which the mixed gas is humidified using a moisture permeable membrane.

On the other hand, when the humidification amount of the mixed gas which is discharged to the anode 13 is excessive, as shown in FIG. 3B, the dew point adjuster 103 includes a condenser 117B which condenses moisture contained in the mixed gas. As the condenser 117B, for example, there may be mentioned a dehumidifier having a bubbler structure in which the mixed gas is allowed to pass through hot water for dehumidification or a dehumidifier having the structure in which the mixed gas is dehumidified using a moisture permeable membrane.

In this case, when the dew point adjuster 103 includes, for example, the above bubbler structure, by the temperature of the hot water, the humidification amount of the mixed gas can be appropriately adjusted. That is, the dew point of the mixed gas passing through the hot water is approximately equal to the temperature of the hot water. Hence, in this case, since the dew point adjuster 103 can either humidify or dehumidify the mixed gas in accordance with the wet state of the mixed gas which is not yet allowed to pass through the hot water, the dew point adjuster 103 can function either as a humidifier humidifying the mixed gas or as a dehumidifier dehumidifying the mixed gas.

In addition, when the dew point adjuster 103 includes, for example, the above moisture permeable membrane, by the temperature of the moisture permeable membrane, the humidification amount of the mixed gas can be appropriately adjusted. That is, the dew point of the mixed gas passing through the moisture permeable membrane is approximately equal to the temperature of the moisture permeable membrane. Hence, in this case, since the dew point adjuster 103 can either humidify or dehumidify the mixed gas in accordance with the wet state of the mixed gas which is not yet allowed to pass through the moisture permeable membrane, the dew point adjuster 103 can function either as a humidifier humidifying the mixed gas or as a dehumidifier dehumidifying the mixed gas.

Accordingly, when the humidification amount of the mixed gas which is supplied to the anode 13 is insufficient, the hydrogen supply system 200 of this example can humidify the mixed gas using the humidifier 117A. Hence, compared to the case in which the humidifier 117A as described above is not provided, the degradation in proton conductivity of the electrolyte membrane 11 of the electrochemical hydrogen pump 100 can be suppressed.

In addition, when the humidification amount of the mixed gas which is supplied to the anode 13 is excessive, the hydrogen supply system 200 of this example can dehumidify the mixed gas using the condenser 117B. Hence, compared to the case in which the condenser 1176 as described above is not provided, the blockage of the gas flow path of the electrochemical hydrogen pump 100 caused by the condensate water can be suppressed from being generated.

Except for the features described above, the hydrogen supply system 200 of this example may be similar to the hydrogen supply system 200 of the first embodiment.

First Modified Example

Figure 3C:
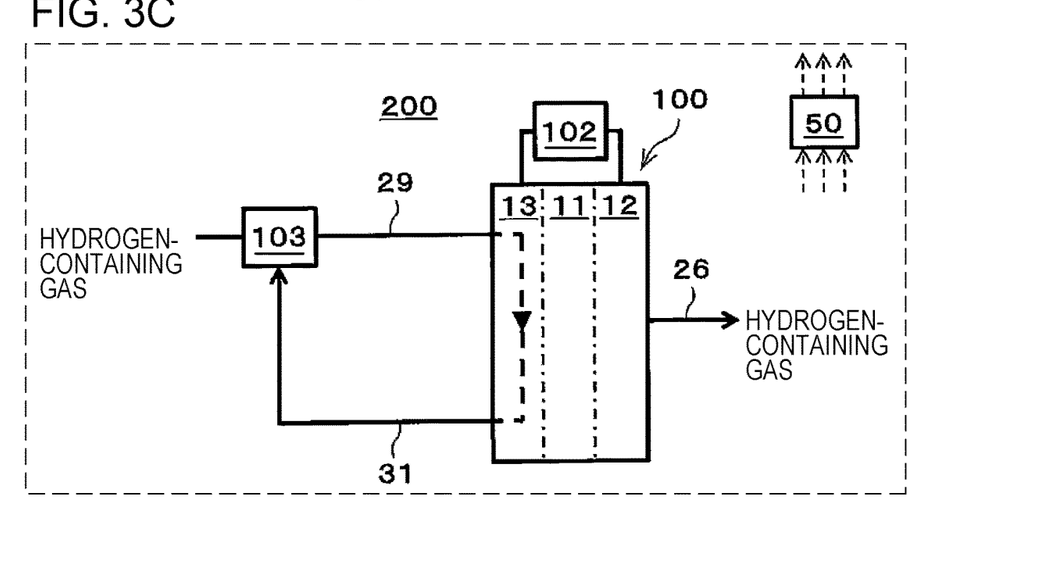
FIG. 3C is a schematic view showing a hydrogen supply system of a first modified example of the first embodiment.

FIG. 3C is a schematic view showing a hydrogen supply system of a first modified example of the first embodiment.

In the example shown in FIG. 3C, a hydrogen supply system 200 includes an electrochemical hydrogen pump 100, a dew point adjuster 103, and a controller 50. Since the electrochemical hydrogen pump 100 is similar to that of the first embodiment, description thereof is omitted.

The hydrogen supply system 200 of this modified example includes a first controller which adjust the dew point of a mixed gas in which a hydrogen-containing gas which is discharged from an anode 13 side and a hydrogen-containing gas which is supplied from the outside are mixed with each other by controlling the operation of the dew point adjuster 103. The controller 50 may be the first controller as described above. The controller 50 may be a controller controlling the total operation of the hydrogen supply system 200.

In addition, the controller 50 may control the operation of the humidifier 117A shown in FIG. 3A or the operation of the condenser 117B shown in FIG. 3B.

In particular, when the humidifier 117A shown in FIG. 3A has, for example, a bubbler structure in which the mixed gas is allowed to pass through hot water for humidification, the controller 50 can easily and appropriately adjust the dew point of the mixed gas by controlling the temperature of the hot water. The control of the temperature of the hot water can be realized by controlling a heating amount of a heater (not shown) provided in the bubbler using the controller 50. When the humidifier 117A has, for example, the structure in which the mixed gas is humidified using a moisture permeable membrane, the controller 50 can easily and appropriately adjust the dew point of the mixed gas by controlling the temperature of the moisture permeable membrane. The control of the temperature of the moisture permeable membrane can be realized by controlling a heating amount of a heater (not shown) heating the moisture permeable membrane using the controller 50.

When the condenser 117B shown in FIG. 3B has, for example, a bubbler structure in which the mixed gas is allowed to pass through hot water for dehumidification, the controller 50 can easily and appropriately adjust the dew point of the mixed gas by controlling the temperature of the hot water. The control of the temperature of the hot water can be realized by controlling a heating amount of a heater (not shown) provided in the bubbler using the controller 50. When the condenser 117B has, for example, the structure in which the mixed gas is dehumidified using a moisture permeable membrane, the controller 50 can easily and appropriately adjust the dew point of the mixed gas by controlling the temperature of the moisture permeable membrane. The control of the temperature of the moisture permeable membrane can be realized by controlling a heating amount of a heater (not shown) heating the moisture permeable membrane using the controller 50.

As long as having a control function, the controller 50 may have any structure. For example, the controller 50 includes a computing circuit (not shown) and a storage circuit (not shown) storing a control program. As the computing circuit, for example, an MPU and/or a CPU may be mentioned. As the storage circuit, for example, a memory may be mentioned. The controller 50 may be formed of either a single controller performing a centralized control or a plurality of controllers performing a decentralized control in cooperation with each other.

Second Modified Example

Except for the control performed by the following current adjuster 102, a hydrogen supply system 200 of this modified example is similar to the hydrogen supply system 200 of the first embodiment.

The current amount flowing between the anode 13 and the cathode 12 of the electrochemical hydrogen pump 100 corresponds to a conduction amount of protons passing through the electrolyte membrane 11. Hence, by adjusting the current amount flowing between the anode 13 and the cathode 12, the amount of water transferred from the anode 13 to the cathode 12 together with protons can be controlled.

Accordingly, the hydrogen supply system 200 of this modified example includes a second controller which changes the dew point of a hydrogen-containing gas which is discharged from an anode 13 side but not yet mixed with a hydrogen-containing gas which is supplied from the outside by adjusting the current amount flowing between the anode 13 and the cathode 12 by the control of the current adjuster 102. For example, the controller 50 shown in FIG. 3C may be the second controller as described above.

In particular, depending on the physical properties of the electrolyte membrane 11, the amount of water transferred from the anode 13 to the cathode 12 together with protons is changed.

For example, in the case of the electrolyte membrane 11 through which more than one water molecule is transferred together with two protons, when the current amount flowing between the anode 13 and the cathode 12 is increased, the dew point of the hydrogen-containing gas which is discharged from the anode 13 side can be decreased.

In addition, in the case of the electrolyte membrane 11 through which less than one water molecule is transferred together with two protons, when the current amount flowing between the anode 13 and the cathode 12 is increased, the dew point of the hydrogen-containing gas discharged from the anode 13 side can be increased.

Except for the above features, the hydrogen supply system 200 of this modified example may be similar to the hydrogen supply system 200 according to any one of the first embodiment, the example of the first embodiment, and the first modified example of the first embodiment.

Second Embodiment

Figure 4A:
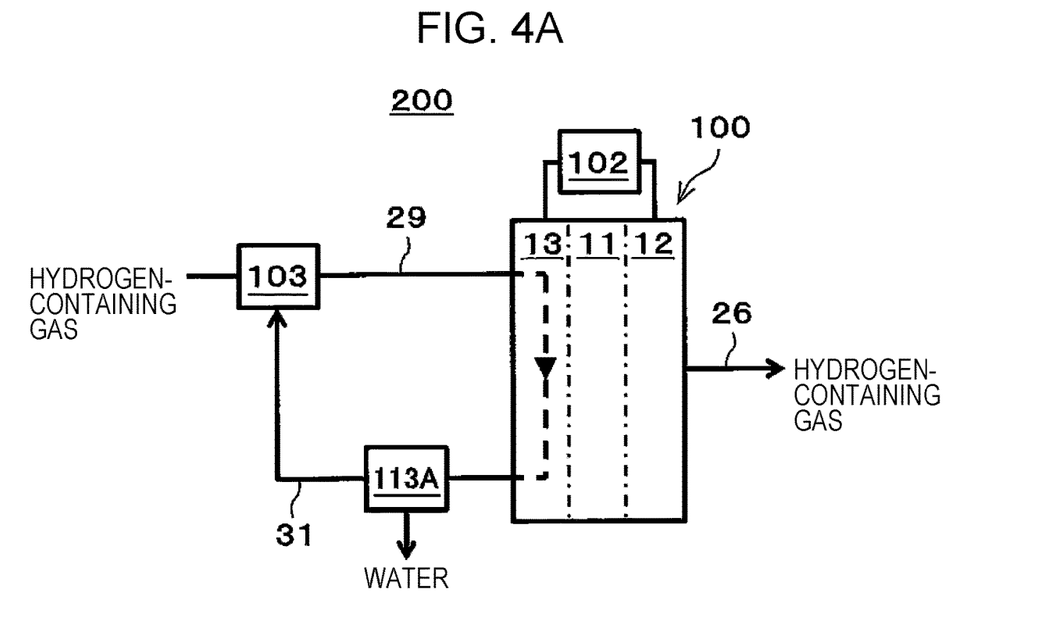
FIG. 4A is a schematic view showing one example of a hydrogen supply system of a second embodiment.

FIG. 4A is a schematic view showing one example of a hydrogen supply system of a second embodiment.

In the example shown in FIG. 4A, a hydrogen supply system 200 includes an electrochemical hydrogen pump 100, a dew point adjuster 103, and a condenser 113A.

Since the electrochemical hydrogen pump 100 and the dew point adjuster 103 are similar to those of the first embodiment, description thereof is omitted.

When the dew point of a hydrogen-containing gas which is discharged from an anode 13 side is high, moisture in the hydrogen-containing gas may be condensed in some cases in an anode gas outlet path 31 due to a decrease in temperature of the hydrogen-containing gas. Accordingly, the flow of the hydrogen-containing gas in the anode gas outlet path 31 may become unstable in some cases. In addition, when water in the hydrogen-containing gas flows into the dew point adjuster 103 through the anode gas outlet path 31, the dew point adjustment of a mixed gas by the dew point adjuster 103 may become unstable in some cases.

Accordingly, the hydrogen supply system 200 of this embodiment includes the condenser 113A which condenses moisture contained in the hydrogen-containing gas which is discharged from the anode 13 side but not yet mixed with a hydrogen-containing gas which is supplied from the outside. That is, the condenser 113A is provided at the anode gas outlet path 31 between a gas discharge port of the anode 13 and the dew point adjuster 103. In addition, a water discharge path (not shown) which discharges condensate water condensed from the hydrogen-containing gas by the condenser 113A may be integrally provided together with the condenser 113A or may be provided at the anode gas outlet path 31 separately from the condenser 113A.

Accordingly, even when the dew point of the hydrogen-containing gas which is discharged from the anode 13 side is high, the hydrogen supply system 200 of this embodiment can appropriately remove water in the hydrogen-containing gas by the condenser 113A. Hence, compared to the case in which the condenser 113A as described above is not provided, the probability in which the flow of the hydrogen-containing gas in the anode gas outlet path 31 becomes unstable by the water in the hydrogen-containing gas can be decreased. In addition, the intrusion of the water in the hydrogen-containing gas into the dew point adjuster 103 through the anode gas outlet path 31 can be suppressed.

Except for the features described above, the hydrogen supply system 200 of this embodiment may be similar to the hydrogen supply system 200 according to any one of the first embodiment, the example of the first embodiment, and the first and the second modified examples of the first embodiment. For example, in the hydrogen supply system 200 shown in FIG. 4A, the controller 50 shown in FIG. 3C may also be provided, and this controller 50 may control the operation of the dew point adjuster 103 shown in FIG. 1, the operation of the humidifier 117A shown in FIG. 3A, and/or the operation of the condenser 117B shown in FIG. 3B.

Modified Example

Figure 4B:
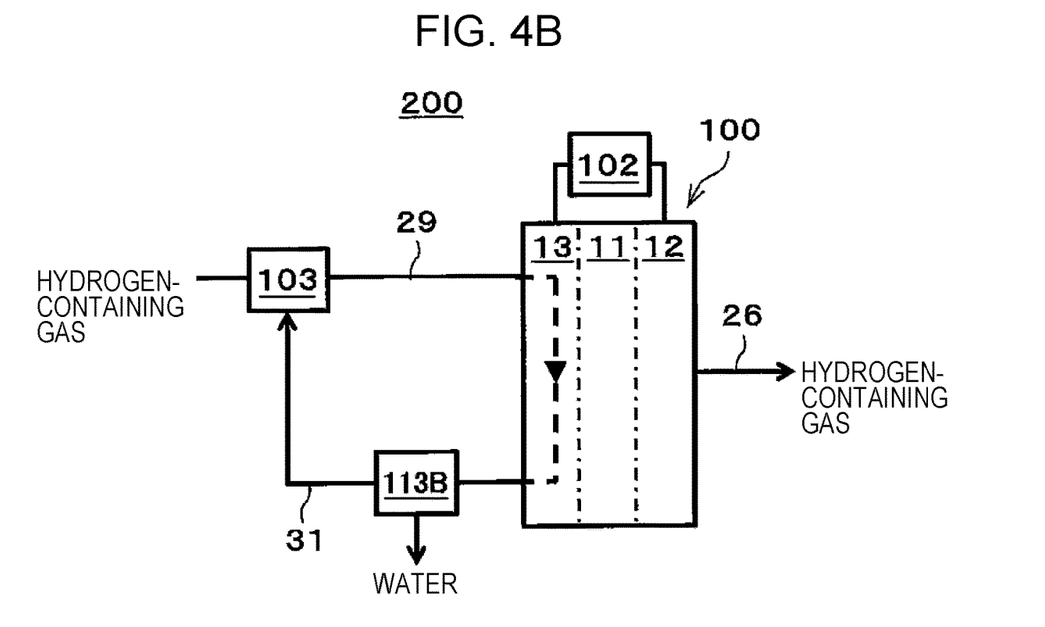
FIG. 4B is a schematic view showing a hydrogen supply system of a modified example of the second embodiment.

FIG. 4B is a schematic view showing a hydrogen supply system of a modified example of the second embodiment.

In the example shown in FIG. 4B, a hydrogen supply system 200 includes an electrochemical hydrogen pump 100, a dew point adjuster 103, and a gas-liquid separator 113B.

Since the electrochemical hydrogen pump 100 and the dew point adjuster 103 are similar to those of the first embodiment, description thereof is omitted.

When the dew point of a hydrogen-containing gas which is discharged from an anode 13 side is high, moisture in the hydrogen-containing gas may be condensed in some cases in an anode gas outlet path 31 by a decrease in temperature of the hydrogen-containing gas. Accordingly, the flow of the hydrogen-containing gas in the anode gas outlet path 31 may become unstable in some cases. In addition, when water in the hydrogen-containing gas flows into the dew point adjuster 103 through the anode gas outlet path 31, the dew point adjustment of a mixed gas by the dew point adjuster 103 may become unstable in some cases.

Accordingly, the hydrogen supply system 200 of this modified example includes the gas-liquid separator 113B which performs a gas-liquid separation of the hydrogen-containing gas which is discharged from the anode 13 side but not yet mixed with a hydrogen-containing gas which is supplied from the outside. That is, the gas-liquid separator 113B is provided at the anode gas outlet path 31 between a gas discharge port of the anode 13 and the dew point adjuster 103. In addition, a water discharge path (not shown) which discharges water separated from the hydrogen-containing gas by the gas-liquid separator 113B may be integrally provided with the gas-liquid separator 113B or may be provided at the anode gas outlet path 31 separately from the gas-liquid separator 113B.

Accordingly, even if the dew point of the hydrogen-containing gas discharged from the anode 13 side is high, the hydrogen supply system 200 of this modified example can appropriately remove water in the hydrogen-containing gas by the gas-liquid separator 113B. Hence, compared to the case in which the gas-liquid separator 113B as described above is not provided, the probability in which the flow of the hydrogen-containing gas through the anode gas outlet path 31 becomes unstable by the water in the hydrogen-containing gas can be decreased. In addition, the intrusion of the water in the hydrogen-containing gas into the dew point adjuster 103 through the anode gas outlet path 31 can be suppressed.

Except for the features described above, the hydrogen supply system 200 of this modified example may be similar to the hydrogen supply system 200 of any one of the first embodiment, the example of the first embodiment, the first and the second modified examples of the first embodiment, and the second embodiment. For example, in the hydrogen supply system 200 shown in FIG. 4B, the controller 50 shown in FIG. 3C may also be provided, and this controller 50 may control the operation of the dew point adjuster 103 shown in FIG. 1, the operation of the humidifier 117A shown in FIG. 3A, and/or the operation of the condenser 117B shown in FIG. 3B.

Third Embodiment

Figure 5:
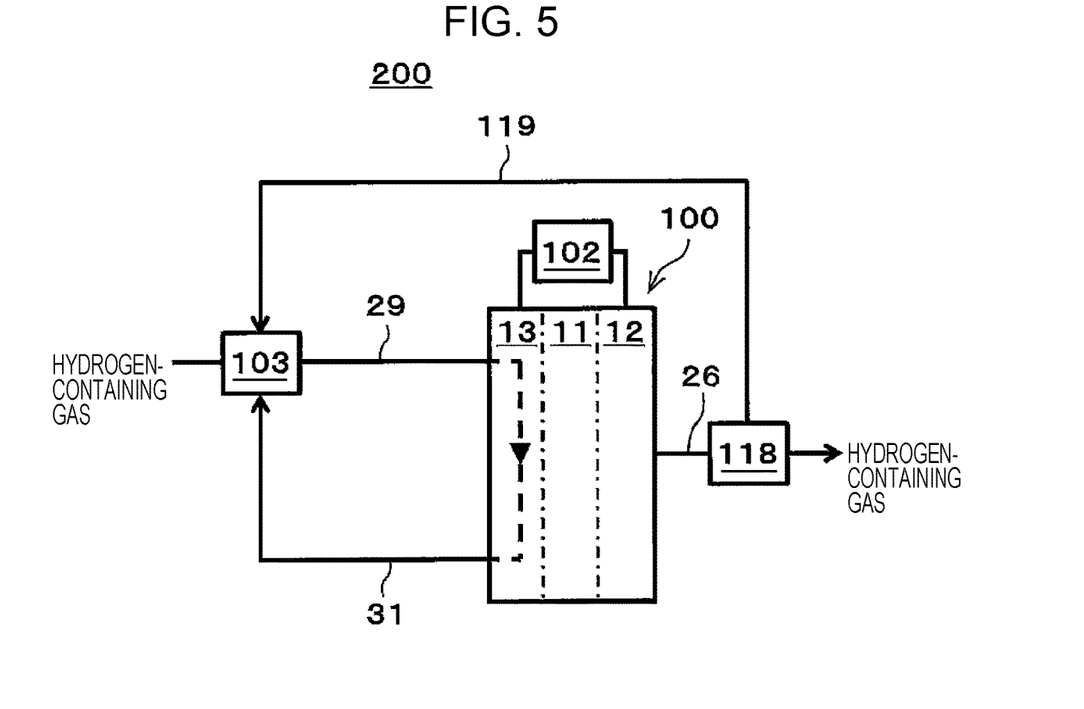
FIG. 5 is a schematic view showing one example of a hydrogen supply system of a third embodiment.

FIG. 5 is a schematic view showing one example of a hydrogen supply system of a third embodiment.

In the example shown in FIG. 5, a hydrogen supply system 200 includes an electrochemical hydrogen pump 100, a dew point adjuster 103, a gas-liquid separator 118, and a water path 119.

Since the electrochemical hydrogen pump 100 and the dew point adjuster 103 are similar to those of the first embodiment, description thereof is omitted.

As the pressure of a hydrogen-containing gas which is discharged from the cathode 12 is increased, moisture in the hydrogen-containing gas is more likely to be condensed.

Accordingly, the hydrogen supply system 200 of this embodiment includes the gas-liquid separator 118 which performs a gas-liquid separation of the hydrogen-containing gas which is discharged from a cathode 12 side and the water path 119 which supplies water separated from the hydrogen-containing gas by the gas-liquid separator 118 to the dew point adjuster 103. That is, the gas-liquid separator 118 is provided at a cathode gas outlet path 26 between a gas discharge port of the cathode 12 and a hydrogen storage device (not shown). The water path 119 may be formed of a pipe connecting a drain outlet of the gas-liquid separator 118 to the dew point adjuster 103.

In particular, in the gas-liquid separator 118, water is separated from the hydrogen-containing gas. In addition, the hydrogen-containing gas processed by the water separation is supplied to the hydrogen storage device through the cathode gas outlet path 26, and the water separated from the hydrogen-containing gas is supplied to the dew point adjuster 103 through the water path 119.

For example, when a drain valve or the like is provided in the gas-liquid separator 118, and, if needed, the drain valve is opened or closed by the use of the pressure of the hydrogen-containing gas, the water can be supplied to the dew point adjuster 103 from the drain outlet of the gas-liquid separator 118.

Accordingly, the hydrogen supply system 200 of this embodiment can supply the water in the hydrogen-containing gas which is discharged from the cathode 12 side to the dew point adjuster 103 using the gas-liquid separator 118 and the water path 119. As a result, the water in the hydrogen-containing gas which is discharged from the cathode 12 side can be re-used for gas humidification in the dew point adjuster 103. Hence, the amount of water to be replenished to the hydrogen supply system 200 from the outside can be decreased.

Except for the features described above, the hydrogen supply system 200 of this embodiment may be similar to the hydrogen supply system 200 of any one of the first embodiment, the example of the first embodiment, the first and the second modified examples of the first embodiment, the second embodiment, and the modified example of the second embodiment. For example, in the hydrogen supply system 200 shown in FIG. 5, the controller 50 shown in FIG. 3C may also be provided, and this controller 50 may control the operation of the dew point adjuster 103 shown in FIG. 1, the operation of the humidifier 117A shown in FIG. 3A, and/or the operation of the condenser 117B shown in FIG. 3B.

Fourth Embodiment

Figure 6:
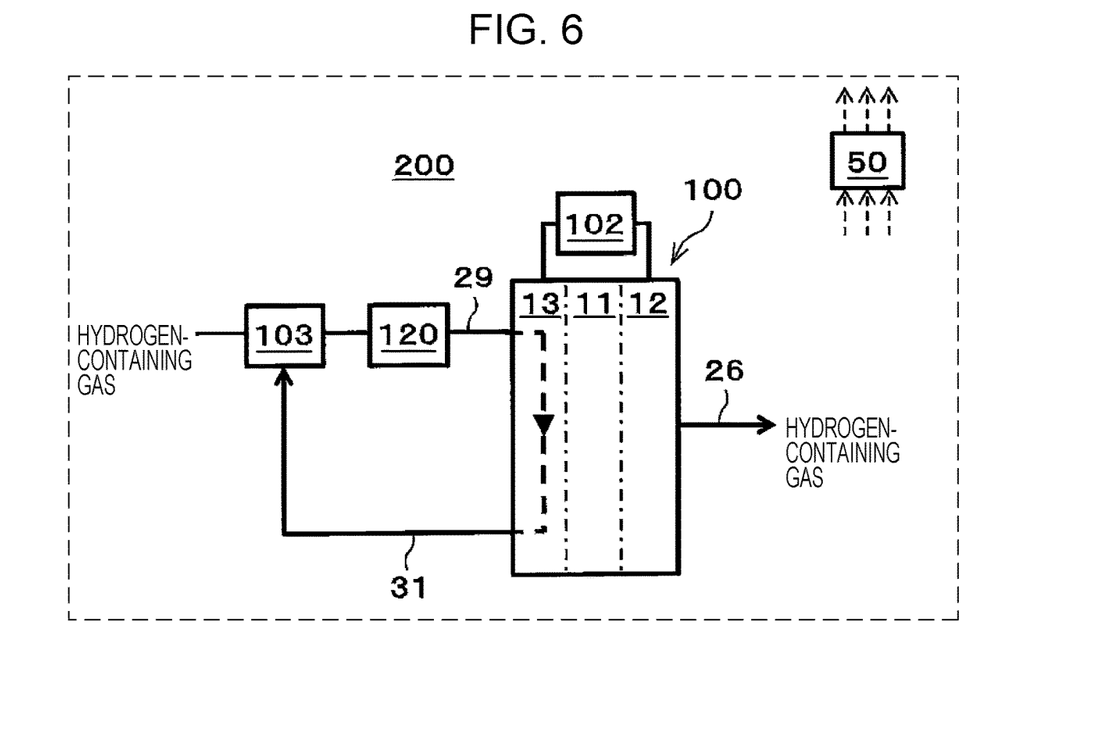
FIG. 6 is a schematic view showing one example of a hydrogen supply system of a fourth embodiment.

FIG. 6 is a schematic view showing one example of a hydrogen supply system of a fourth embodiment.

In the example shown in FIG. 6, a hydrogen supply system 200 includes an electrochemical hydrogen pump 100, a dew point adjuster 103, a controller 50, and a heater 120.

Since the electrochemical hydrogen pump 100 and the dew point adjuster 103 are similar to those of the first embodiment, description thereof will be omitted.

When the temperature of a mixed gas discharge from the dew point adjuster 103 is decreased to less than the dew point of the mixed gas by heat dissipation or the like, the condensation of moisture in the mixed gas occurs.

Accordingly, the hydrogen supply system 200 of this embodiment includes the heater 120 which heats the mixed gas discharged from the dew point adjuster 103 and a third controller which controls the heater 120 to increase the temperature of the mixed gas heated by the heater 120 to the dew point or more of the mixed gas discharged from the dew point adjuster 103. That is, the heater 120 is provided at an anode gas inlet path 29 between the dew point adjuster 103 and a gas inlet port of the anode 13. The controller 50 may be the third controller as described above.

Accordingly, compared to the case in which the heater 120 described above is not provided, since the condensation of moisture in the mixed gas is not likely to occur, the hydrogen supply system 200 of this embodiment can suppress the flow of the mixed gas from becoming unstable by the condensate water. In addition, the generation of blockage of the gas flow path of the electrochemical hydrogen pump 100 caused by the intrusion of the condensate water into the anode 13 can also be suppressed.

Except for the features described above, the hydrogen supply system 200 of this embodiment may be similar to the hydrogen supply system 200 of any one of the first embodiment, the example of the first embodiment, the first and the second modified examples of the first embodiment, the second embodiment, the modified example of the second embodiment, and the third embodiment.

In addition, the first embodiment, the example of the first embodiment, the first and the second modified examples of the first embodiment, the second embodiment, the modified example of the second embodiment, the third embodiment, and the fourth embodiment may be used in combination so as not to conflict with each other.

In addition, from the above description, many improvements and other embodiments of the present disclosure are apparent to a person skilled in the art. Hence, the above description is to be understood as examples and is made in order to provide the best mode of carrying out the present disclosure to a person skilled in the art. Accordingly, without departing from the spirit and the scope of the present disclosure, details of the structure and/or the function may by substantially changed and/or modified.

For example, although the case in which hydrogen from the electrochemical hydrogen pump 100 is stored in the hydrogen storage device has been described above, even when hydrogen is directly supplied to the hydrogen demander by the hydrogen supply system not through the hydrogen storage device or by the hydrogen supply system not provided with the hydrogen storage device (for example, the case in which hydrogen is supplied to a high pressure hydrogen tank of a fuel cell vehicle), the hydrogen supply system 200 according to one aspect of the present disclosure can be applied to the case described above.

One aspect of the present disclosure can be used for a hydrogen supply system which is able to more efficiently perform a hydrogen supply operation of an electrochemical hydrogen pump as compared to that in the past.

What is claimed is:

1. A hydrogen supply system comprising:
an electrochemical hydrogen pump which includes:
an electrolyte membrane;
an anode provided on a first surface of the electrolyte membrane;
a cathode provided on a second surface of the electrolyte membrane opposite to the first surface; and
a current adjuster adjusting a current amount flowing between the anode and the cathode, and which performs a hydrogen supply operation by allowing a current to flow between the anode and the cathode using the current adjuster so as to boost the pressure of hydrogen which is supplied to an anode side at a cathode side and to supply the pressure-boosted hydrogen to a hydrogen demander; and
a dew point adjuster adjusting a dew point of a mixed gas in which a hydrogen-containing gas which is discharged from the anode side and a hydrogen-containing gas which is supplied from an outside are mixed together.

2. The hydrogen supply system according to claim 1, wherein the dew point adjuster includes a humidifier which humidifies the mixed gas.

3. The hydrogen supply system according to claim 1, wherein the dew point adjuster includes a first condenser which condenses moisture contained in the mixed gas.

4. The hydrogen supply system according to claim 1, further comprising a second condenser condensing moisture contained in the hydrogen-containing gas which is discharged from the anode side but not yet mixed with the hydrogen-containing gas which is supplied from the outside.

5. The hydrogen supply system according to claim 1, further comprising a first gas-liquid separator performing a gas-liquid separation of the hydrogen-containing gas which is discharged from the anode side but not yet mixed with the hydrogen-containing gas which is supplied from the outside.

6. The hydrogen supply system according to claim 1, further comprising a second gas-liquid separator performing a gas-liquid separation of a hydrogen-containing gas which is discharged from the cathode side; and a water path for supplying water separated from the hydrogen-containing gas by the second gas-liquid separator to the dew point adjuster.

7. The hydrogen supply system according to claim 1, further comprising a first controller adjusting the dew point of the mixed gas by controlling the operation of the dew point adjuster.

8. The hydrogen supply system according to claim 1, further comprising a second controller changing the dew point of the hydrogen-containing gas which is discharged from the anode side but not yet mixed with the hydrogen-containing gas which is supplied from the outside by adjusting the current amount flowing between the anode and the cathode by the control of the current adjuster.

9. The hydrogen supply system according to claim 1, further comprising a heater heating the mixed gas discharged from the dew point adjuster; and a third controller which increases the temperature of the mixed gas heated by the heater to the dew point or more of the mixed gas discharged from the dew point adjuster by the control of the heater.

* * * * *